July 30, 1935. E. J. GOVANUS 2,009,580
NAILING TOOL
Original Filed Oct. 1, 1930 2 Sheets-Sheet 2
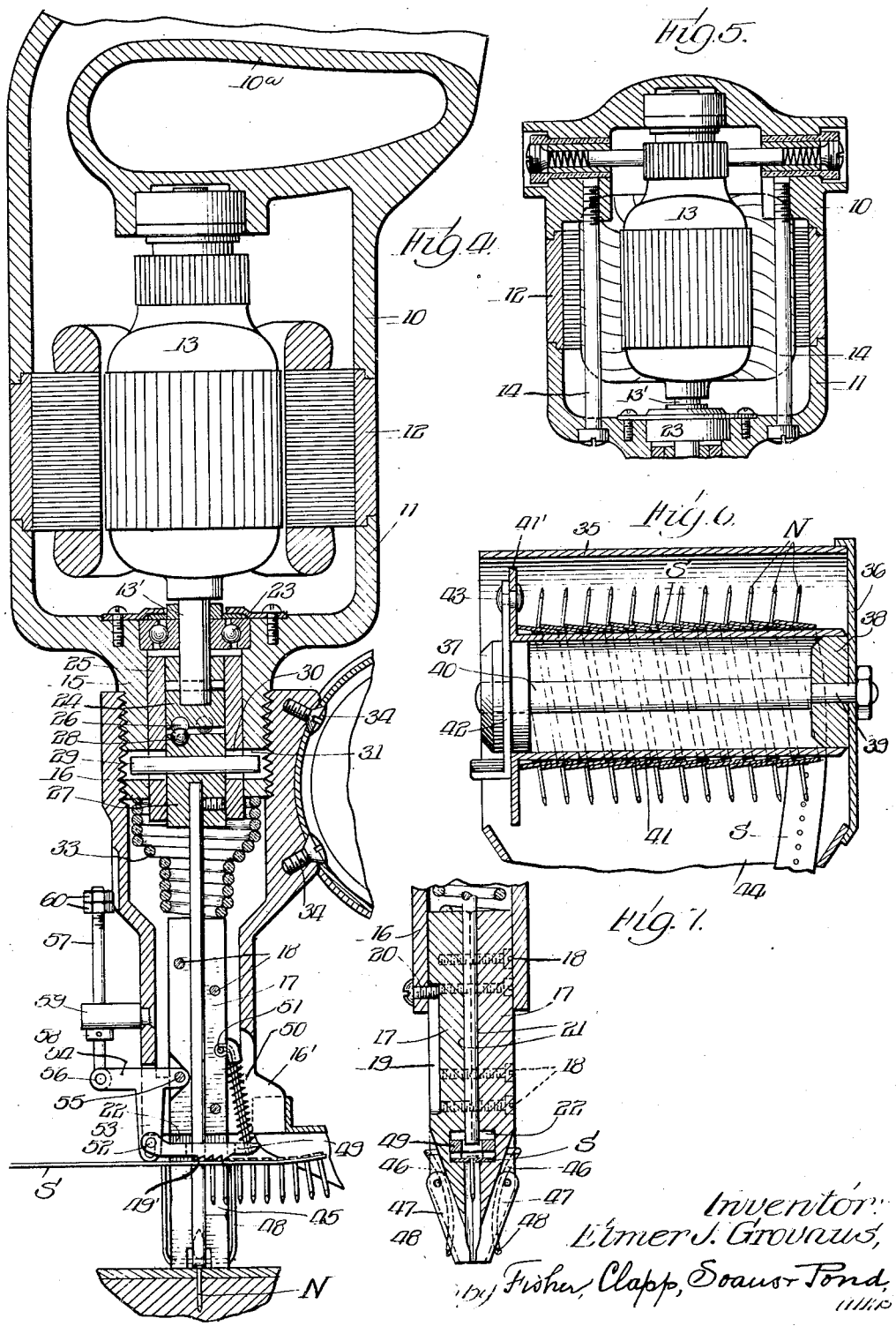

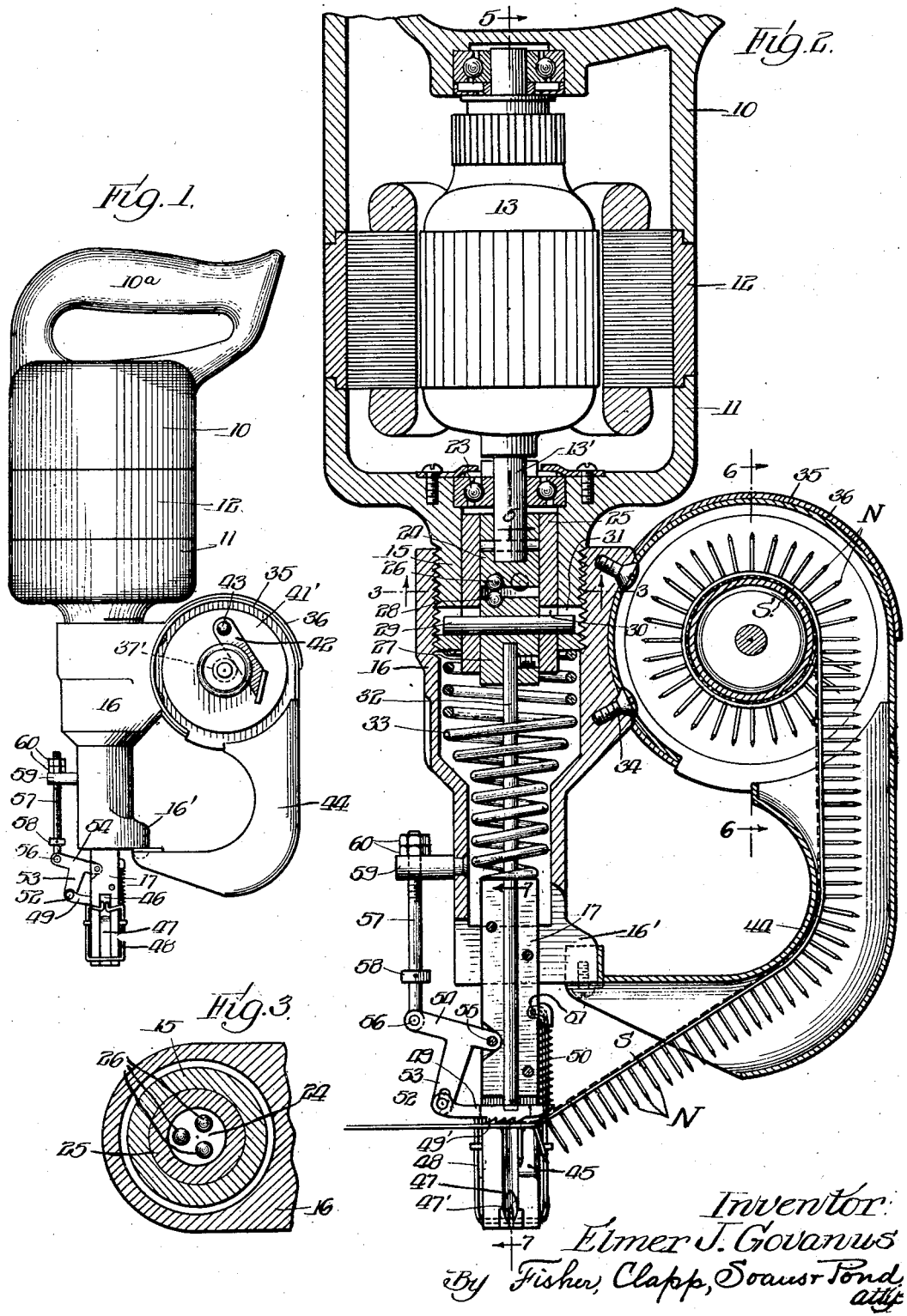

Patented July 30, 1935

2,009,580

UNITED STATES PATENT OFFICE 2,009,580

NAILING TOOL

Elmer J. Govanus, Chicago, Ill., assignor of one-half to Walter G. Govanus, Chicago, Ill.

Application October 1, 1930, Serial No. 485,633
Renewed November 4, 1933

11 Claims. (Cl. 1—53)

This invention relates to the art of nailing appliances, and has reference more particularly to a portable nailing tool of that type wherein the nail chuck is manually pressed against the work and the nail is driven by a power operated driver.

The principal object of the invention is to provide a simple, practical and highly efficient portable implement or tool of the type above indicated, well adapted for such work as the driving of nails or tacks in rapid succession for the fastening of veneers or other covering materials. In its preferred form the tool of my invention, generally described, comprises a supporting member, a relatively movable nail holding chuck associated therewith, a driver extending through the chuck and having a lost motion connection with the supporting member, a spring interposed between the supporting member and the chuck for normally holding the latter advanced and the driver retracted, and power actuated means carried by the supporting member for reciprocating the driver when the latter is manually advanced against the tension of the spring. The tool also preferably is equipped with a reel carrying a nail strip, and an automatic mechanism for feeding the strip through the nail chuck to successively present the nails to the action of the driver.

A practical embodiment of the invention is illustrated in the accompanying drawings in which—

Fig. 1 is a side elevation of the tool.

Fig. 2 is an enlarged longitudinal axial section showing the nail chuck in advanced position.

Fig. 3 is a sectional detail on the line 3—3 of Fig. 2.

Fig. 4 is a longitudinal sectional view similar to Fig. 2, but showing the parts in the positions assumed at the conclusion of the nail driving operation.

Fig. 5 is a sectional detail on the line 5—5 of Fig. 2.

Fig. 6 is a sectional detail on the line 6—6 of Fig. 2.

Fig. 7 is a vertical axial section of the nail chuck and the lower portion of its guide on the line 7—7 of Fig. 2.

Referring to the drawings, the supporting member of the tool comprises a motor housing or casing and a chuck guide continuous with the lower end of the motor housing. For convenience of assembly, the motor housing or casing is herein shown as comprising upper and lower sections 10 and 11, between which is clamped the field frame 12 of an electric motor 13 by means of long through-bolts 14 shown in Fig. 5. Integral with the upper section 10 is a handle member 10ᵃ by which the tool is manually applied to the work, and integral with the lower section 11 of the motor casing is a threaded hollow boss 15, on which is screwed the upper end of the chuck guide 16. Slidably mounted in the lower narrowed portion of the chuck guide 16 is the nail chuck preferably formed in mating longitudinal sections 17 united by bolts 18. A longitudinal slot 19 (Fig. 7) formed in the nail chuck is entered by a screw 20 mounted in the chuck guide 16, this slot and screw manifestly limiting the relative sliding movement of the chuck and its guide. The meeting faces of the chuck sections 17 are longitudinally channeled throughout their full length, as shown at 21, to form a passageway for the rod of the driver or hammer hereinafter described. The lower portion of the nail chuck is also formed with a transverse slot 22, clearly shown in Fig. 7, that intersects the longitudinal channel 21 and forms a passageway for the nail strip and its feeding device.

The armature shaft 13' of the motor 13 is journaled in a lateral anti-friction bearing 23 and to its lower end is keyed a cylindrical block 24 that rotates in a bushing sleeve 25 tightly fitted in the boss 15 of the motor casing. In the lower face of the block 24 are seated a group of hardened steel balls 26 herein shown as three in number, spaced 120° apart (see Fig. 3). Slidably mounted in the sleeve 25 below the block 24 is a cylindrical block 27, in the upper face of which is seated a similar hardened steel ball 28 located at the same radial distance from the axis of the blocks 24 and 27 as the balls 26. The block 27 is confined against rotation and afforded a limited endwise lost motion relatively to the sleeve 25 by means of a cross pin 29 that extends through registering slots 30 and 31 in the sleeve 25 and boss 15, said slots having a width sufficiently in excess of the diameter of the pin 29 to provide for the requisite amount of lost motion necessary to accommodate the rebound of the driver between successive blows thereon caused by the camming action of the balls 26 and 28. Secured in and depending from the block 27 is a rod 32 that extends downwardly through the longitudinal channel 21 of the nail chuck and forms the nail engaging-member of the driver or hammer. Confined endwise between the lower end of the boss 15 and the upper end of the nail chuck 17, and encircling the driver rod 32, is a compression spring 33.

Attached to one side of the supporting member, and preferably to the upper portion of the chuck guide 16, as by screws 34 is a reel casing 35 formed with a head 36 (Fig. 6) in which is secured a spool holder or arbor comprising a pair of heads 37 and 38, a through-bolt 39 mounted in the casing head 36 and a spacing sleeve 40 between said heads. 41 designates the cylindrical body of the spool or reel formed with a head 41' on one end thereof, on which spool is wound in spiral formation a paper strip S carrying the nails N mounted at uniformly spaced distances therein. To lock the reel or spool on the spool holder, against displacement endwise while permitting its free rotation, the outer head 37 of the spool holder is formed with a circular groove 37' (see Fig. 1) that is engaged by a latch 42 pivoted at 43 to the spool head 41'. Continuous with the lower side of the reel casing is a depending strip cover and guide 44, formed with downwardly convergent side walls as shown in Fig. 6, the lower end of which guide may be attached to a lug 16' on the chuck guide 16, as clearly shown in Figs. 1 and 2. As shown in Figs. 2, 4 and 7, the nail strip passes from the guide 44 into and through the transverse slot 22 of the nail chuck. To permit the free passage of the nails themselves into the nail chuck, the latter is formed with a vertical slot 45 (Fig. 2) that registers with the longitudinal channel 21; said channel 21 presenting a solid vertical wall on the side thereof opposite the slot 45 to arrest each nail at a point directly below the driver rod 32.

To support the nail laterally during the driving operation, the lower end of the nail chuck is formed with vertical slots 46 in opposite side walls thereof, and in these slots are pivoted at their upper ends, a pair of jaws 47, the lower ends of which are normally pressed together by a pair of U springs 48. As shown in Fig. 2, the tips of the inner faces of the jaws 47 are preferably formed with opposed small registering channels 47' adapted to embrace and support a nail as the latter is driven through them.

The nail strip is automatically advanced through the nail chuck between successive nail driving operations by an automatic feed mechanism preferably organized substantially as follows. Reciprocable through the slot 22 of the nail chuck is a claw 49 longitudinally slotted to straddle the driver rod 32 and formed with teeth 49' on its lower side to grip the nail strip S. At one end the claw 49 is pressed downwardly by a thrust spring 50 stepped thereon and at its upper end anchored to the nail chuck at 51. The wall of the chuck guide 16 is slotted to provide clearance for the spring 50 during the nail driving operation, as shown in Fig. 4. The other end of the claw 49 is articulated at 52 to the depending arm 53 of a T lever, the other arm 54 of which lever is pivoted at one end at 55 to the nail chuck, while its other end is pivoted at 56 to the lower end of an eye-bolt 57, pinned on which latter is a collar 58. The upper portion of the eye-bolt 57 slidingly extends through an apertured striker lug 59 mounted in one side of the chuck guide 16, and is equipped at its upper end with nuts 60. By reason of this mechanism, both the working and idle or return movements of the claw 49 are effected by the relative sliding movements of the nail chuck and the chuck guiding and supporting member. The lower end of the chuck guide 16 is suitably slotted to provide clearance for the feed actuating lever 53, 54.

Briefly describing the operation, and assuming that the advance end of the nail strip has been threaded through the nail chuck to the position shown in Fig. 2, the operator applies the nose of the nail chuck to the work to be nailed, closes the motor circuit, and then exerts an inward push or thrust on the handle 10ᵃ. This causes the chuck guide 16 to slide downwardly on the chuck, compressing the spring 33. At the same time the lower end of the driver rod 32 pierces the nail strip carrying the underlying nail before it until the point of the nail strikes the work, at which time it is embraced and supported laterally by the jaws 47. Continued pressure on the handle 10ᵃ manifestly tends to bring the opposed faces of the motor block 24 and driver block 27 toward each other, so that camming action of the balls 26 on the ball 28 exerts a series of rapid blows by which the nail is driven as the downward pressure on the tool is maintained. Just before the nail is fully driven, the striker lug 59 strikes the collar 58, and thus effects the return or idle movement of the feed claw 49 to the position shown in Fig. 4. The driver rod 32 having pierced the paper, the paper strip cannot move while the feed claw 49 makes its idle stroke. The nail has now been driven, and the tool is raised from the work for a new position on the latter. As the tool is raised, the spring 33 expands, forcing the nail chuck outwardly. This causes the striker lug 59 to strike the nuts 60, and this, through the T lever 53, 54, effects an advance or working stroke of the feed claw 49 thus bringing the next nail into alignment with the driver, whereupon the tool is again pressed onto the work at the next nailing point, and the described cycle of operations is repeated. As the claw 49 advances with the strip, the internal wall of the chuck opposite the slot 45 forms a stop to arrest further travel of the foremost nail, so that if the feed stroke of the claw is in excess of that required to center the nail beneath the driver, the claw simply slips over the strip after further travel of the latter has been thus arrested.

By the use of the described implement it is possible to effect nailing and tacking operations at a high speed, and with but slight physical effort on the part of the operator. The motor supplies the driving power, while the operator has only to exert a sufficient pressure to maintain the driving cams 26 operatively engaged with the driven cam 28. When the tool is raised from the work, the action of the strip feed mechanism is entirely automatic, being effected by the spring 33 and chuck 17.

I have herein shown and described one physical embodiment of the principle of the invention which, in practice, has been found to satisfactorily effectuate the stated purposes and objects thereof. Manifestly, however, many of the structural details thereof might be variously modified within the principle of the invention and without sacrificing its efficiency, and hence the invention is not to be understood as confined to the specific structure shown for purposes of illustration, but comprehends such variations and modifications as fall within the spirit and purview of the appended claims.

I claim:

1. In a portable nailing tool, the combination of a supporting member, a motor carried by said supporting member, a rotary shaft driven by said motor, a reciprocating hammer having a lost motion connection with said supporting member and disposed in line with said drive shaft, a reciprocating nail chuck through which said hammer extends, cooperating cam lugs on the opposed ends of said shaft and hammer through which the rotary movement of said shaft imparts successive blows to said hammer, and a thrust spring for normally holding said chuck in advanced position.

2. In a portable nailing tool, the combination of a motor support, and a chuck guide continuous with said support, a motor mounted on said support, a rotary drive shaft driven by said motor, a sliding hammer having a lost motion connection to said motor support and disposed in line with said drive shaft, a nail chuck slidable in said chuck guide, cooperating cam lugs on the opposed ends of said drive shaft and hammer through which the rotary movement of said shaft imparts successive blows to said hammer, a thrust spring encircling said hammer and engaging said chuck for normally holding the latter in advanced position, and means limiting the sliding movement of said chuck in said chuck guide.

3. In a portable nailing tool, the combination of a motor casing formed with a handle on one end thereof, a chuck guide connected to the other end of said casing, a motor mounted in said casing, a rotary drive shaft driven by said motor, a nail chuck slidable in said chuck guide, a hammer comprising a head having a lost motion connection to said motor casing and a rod slidable through said chuck, cooperating cam lugs on the opposed ends of said drive shaft and hammer head, a thrust spring in said chuck guide encircling said hammer rod and engaging said chuck for normally holding the latter in advanced position, and means limiting the sliding movement of said chuck in said chuck guide.

4. In a portable nailing tool, the combination of a supporting member, a hammer mounted in said supporting member, an outwardly spring-pressed nail chuck slidable in said supporting member and transversely slotted for the passage of a nail-carrying strip therethrough, and a strip feed mechanism operated on its working stroke by said chuck.

5. In a portable nailing tool, the combination of a supporting member, a hammer mounted in said supporting member, an outwardly spring-pressed nail chuck slidably mounted in said supporting member and transversely slotted for the passage of a nail-carrying strip therethrough, a strip feeding member reciprocable through the slot of said chuck, and mechanism for reciprocating said feeding member actuated in one direction by said chuck and in the other direction by said supporting member.

6. In a portable nailing tool, the combination of a supporting member, a hammer mounted in said supporting member, an outwardly spring-pressed nail chuck slidably mounted in said supporting member and transversely slotted for the passage of a nail-carrying strip therethrough, a strip-feeding claw reciprocable through the slot of said chuck, a spring pressing said claw onto the strip, and mechanism for reciprocating said claw actuated by said chuck in one direction to effect a working stroke of said claw and by said supporting member in the other direction to effect a return movement of said claw.

7. In a portable nailing tool, the combination of a supporting member, a nail chuck slidably mounted in said supporting member and transversely slotted for the passage of a nail-carrying strip therethrough, a spring urging said chuck outwardly of said supporting member, a reel for said strip rotatively mounted on said supporting member, a strip-feeding device mounted on said chuck, a power driven hammer on said supporting member, and mechanism for actuating said feeding member itself actuated by relative in and out movements of said supporting member and chuck.

8. In a portable nailing tool, the combination with a supporting member, and a nail chuck mounted on said supporting member and transversely slotted for the passage of a nail-carrying strip therethrough, of a holder for said strip comprising a fixed arbor mounted on said supporting member, a spool rotatably mounted on said arbor and of a length sufficient to permit said strip to be spirally wound thereon, means for locking said spool against endwise displacement from said arbor, and a fixed guide between said spool and said chuck formed with downwardly convergent side walls, through which guide said strip slides in its passage from the spool to the nail chuck.

9. A portable nailing tool comprising a support, a reciprocating nail holding chuck, a driver movable through said chuck and having a limited lost motion connection with the support, means holding the driver against rotation, a spring interposed between the support and chuck for normally holding the latter advanced and the driver retracted, and a power driven shaft journaled in the support in line with the driver, the adjacent ends of the shaft and driver having eccentric cam lugs for effecting hammer blows on the driver as the chuck is pressed against the work and as the support and driver are advanced against the pressure of said spring.

10. A portable nailing tool comprising a support, a rotary drive shaft journaled therein, a reciprocating nail holding chuck, a driver extending through said chuck in line with said shaft and having a lost motion connection with the support permitting free movement of the driver to and from the rotary shaft, and a spring interposed between the support and the chuck for normally holding the latter advanced and the driver retracted, the driver and shaft having cooperating eccentric cam lugs for applying blows to the driver as the chuck is pressed against the work and as the support and driver are advanced against the pressure of said spring.

11. A portable nailing tool comprising a rotary electric motor, a hollow support forming a casing for the motor and in which the motor shaft is journaled, said support having a guide extending from one end in line with the motor shaft, a nail holding chuck mounted in said guide, a nail driver extending through said chuck in line with the shaft and having a limited lost motion connection with said support, and a spring for normally holding the chuck advanced and the driver retracted, the driver and the motor shaft having eccentric cam lugs on their adjacent ends for applying hammer blows to a nail in the chuck when the latter is pressed against the work and as the support and driver are advanced against the pressure of said spring.

ELMER J. GOVANUS.